(12) United States Patent
Ledet (10) Patent No.: US 10,805,409 B1
(45) Date of Patent: Oct. 13, 2020

(54) LOCATION BASED NOTIFICATIONS (71) Applicant: Open Invention Network LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 212 days.

(21) Appl. No.: 14/837,967

(22) Filed: Aug. 27, 2015

Related U.S. Application Data (60) Provisional application No. 62/114,152, filed on Feb. 10, 2015.

(51) Int. Cl.
*G06F 15/16* (2006.01)
*H04L 29/08* (2006.01)

(52) U.S. Cl.
CPC .............. *H04L 67/18* (2013.01); *H04L 67/10* (2013.01); *H04L 67/22* (2013.01)

(58) Field of Classification Search
CPC ....... H04W 4/02; H04W 64/00; H04W 4/023; H04W 4/206; H04L 67/18; H04L 67/306; H04L 51/20; H04L 51/32; H04L 12/5865; H04L 67/22; H04L 67/10; G06Q 10/10; G06Q 50/22; G06Q 10/109; G06Q 10/1093; G06Q 10/06; G06Q 10/1095; G06Q 30/0261; G06Q 20/3224; G06Q 30/0205; G06Q 10/06314
USPC ....................................................... 709/204
See application file for complete search history.

(56) References Cited

U.S. PATENT DOCUMENTS

| | | | |
|---|---|---|---|
| 6,526,529 B1 | 2/2003 | Miksovsky et al. | |
| 6,782,510 B1 | 8/2004 | Gross et al. | |
| 7,251,782 B1 | 7/2007 | Albers et al. | |
| 7,295,657 B1 | 11/2007 | Keohane et al. | |
| 8,229,458 B2 | 7/2012 | Busch | |
| 8,316,237 B1 | 11/2012 | Felsher et al. | |
| 8,441,367 B1 * | 5/2013 | Lee .................. | G08B 21/18 340/539.13 |
| 8,468,253 B2 * | 6/2013 | Guzman ............ | H04L 12/1818 370/261 |
| 8,495,731 B1 | 7/2013 | Mar et al. | |
| 8,577,422 B1 | 11/2013 | Ledet | |
| 8,645,825 B1 | 2/2014 | Cornea et al. | |
| 8,713,027 B2 | 4/2014 | Forutanpour et al. | |
| 9,059,870 B1 | 6/2015 | Sobel | |
| 9,160,806 B1 | 10/2015 | Ledet | |
| 9,244,905 B2 | 1/2016 | Joshi et al. | |
| 9,318,108 B2 | 4/2016 | Gruber et al. | |
| 9,372,711 B2 | 6/2016 | Galicia et al. | |
| 9,386,152 B2 | 7/2016 | Riahi et al. | |
| 9,574,671 B1 | 2/2017 | Amberg et al. | |
| 2002/0087649 A1 | 7/2002 | Horvitz | |
| 2002/0160757 A1 | 10/2002 | Shavit et al. | |
| 2004/0098462 A1 | 5/2004 | Horvitz et al. | |
| 2004/0205451 A1 | 10/2004 | Kowalski | |
| 2004/0254998 A1 | 12/2004 | Horvitz | |

(Continued)

OTHER PUBLICATIONS

Claudiu et al., "The Personal Assistant Application, Problem, Definition", IEEE 4th International Conference on Cognitive Infocommunications, Dec. 2013, pp. 1-13.

*Primary Examiner* — Oleg Survillo (57) ABSTRACT

A location-based notification application may generate a location based notification on a client device based on a location of the client device and data stored within the client device.

19 Claims, 8 Drawing Sheets

(56) References Cited

U.S. PATENT DOCUMENTS

| | | |
|---|---|---|
| 2005/0113123 A1* | 5/2005 | Torvinen ............... H04W 4/021 455/519 |
| 2005/0149622 A1 | 7/2005 | Kirkland et al. |
| 2005/0195975 A1 | 9/2005 | Kawakita |
| 2005/0204004 A1 | 9/2005 | McKay |
| 2006/0085504 A1 | 4/2006 | Yang et al. |
| 2006/0095524 A1 | 5/2006 | Kay et al. |
| 2006/0106675 A1 | 5/2006 | Cohen et al. |
| 2006/0211435 A1 | 9/2006 | Nielsen et al. |
| 2006/0259767 A1 | 11/2006 | Mansz et al. |
| 2007/0250587 A1 | 10/2007 | Roberts |
| 2008/0074488 A1* | 3/2008 | Thompson ......... H04L 12/1822 348/14.08 |
| 2008/0114846 A1 | 5/2008 | Sano |
| 2009/0019120 A1 | 1/2009 | Muguda |
| 2009/0049140 A1 | 2/2009 | Stoddard et al. |
| 2009/0089252 A1 | 4/2009 | Galitsky et al. |
| 2009/0100099 A1 | 4/2009 | Buckwalter |
| 2009/0228583 A1 | 9/2009 | Pocklington et al. |
| 2009/0235280 A1 | 9/2009 | Tannier et al. |
| 2009/0271486 A1 | 10/2009 | Ligh et al. |
| 2010/0017194 A1 | 1/2010 | Hammer et al. |
| 2010/0017843 A1 | 1/2010 | Hilerio et al. |
| 2010/0075639 A1* | 3/2010 | Horvitz ................... G08G 1/01 455/412.2 |
| 2010/0110478 A1* | 5/2010 | Mathur ............. H04N 1/00233 358/1.15 |
| 2010/0148954 A1* | 6/2010 | Bobier ................... H04W 4/02 340/539.11 |
| 2010/0205123 A1 | 8/2010 | Sculley et al. |
| 2010/0262452 A1 | 10/2010 | Gibson et al. |
| 2010/0289640 A1* | 11/2010 | Annamalai ............ H04W 4/02 340/539.13 |
| 2011/0055334 A1 | 3/2011 | Tivyan |
| 2011/0106892 A1 | 5/2011 | Nelson et al. |
| 2011/0231493 A1 | 9/2011 | Dyor |
| 2011/0289422 A1 | 11/2011 | Spivack et al. |
| 2012/0009692 A1 | 4/2012 | Stoddard et al. |
| 2012/0135705 A1 | 5/2012 | Thaker |
| 2012/0150964 A1 | 6/2012 | Gourevitch et al. |
| 2012/0157165 A1 | 6/2012 | Kim et al. |
| 2012/0192085 A1 | 7/2012 | Lu et al. |
| 2012/0198002 A1 | 8/2012 | Goulart et al. |
| 2012/0239761 A1 | 9/2012 | Linner et al. |
| 2012/0260188 A1 | 10/2012 | Park et al. |
| 2012/0289254 A1* | 11/2012 | Dishneau ........... G06Q 10/1097 455/456.3 |
| 2012/0311460 A1* | 12/2012 | Boyd ................... G06Q 10/109 715/752 |
| 2012/0324242 A1 | 12/2012 | Kirsch |
| 2013/0007648 A1 | 1/2013 | Gamon et al. |
| 2013/0040604 A1 | 2/2013 | Sprigg et al. |
| 2013/0060772 A1 | 3/2013 | Clark et al. |
| 2013/0107312 A1* | 5/2013 | Venkatesh ............. G06F 3/1207 358/1.15 |
| 2013/0151421 A1 | 6/2013 | Ploeg et al. |
| 2013/0283401 A1 | 10/2013 | Pabla et al. |
| 2013/0288722 A1 | 10/2013 | Ramanujam et al. |
| 2013/0331127 A1* | 12/2013 | Sabatelli ............... H04W 4/021 455/456.3 |
| 2013/0332721 A1* | 12/2013 | Chaudhri .............. G06F 9/4421 713/100 |
| 2014/0082726 A1 | 3/2014 | Dreller et al. |
| 2014/0141818 A1 | 5/2014 | Yoakum |
| 2014/0181219 A1 | 6/2014 | Wang et al. |
| 2014/0195927 A1 | 7/2014 | DeWeese et al. |
| 2014/0210702 A1* | 7/2014 | Peterson ................. G06F 3/013 345/156 |
| 2014/0236478 A1 | 8/2014 | Mermelstein |
| 2014/0359022 A1 | 12/2014 | Buddenbaum et al. |
| 2015/0019982 A1 | 1/2015 | Petitt et al. |
| 2015/0039659 A1 | 2/2015 | Sauber et al. |
| 2015/0058242 A1 | 2/2015 | Bucciarelli |
| 2015/0082371 A1 | 3/2015 | DeWeese et al. |
| 2015/0105106 A1 | 4/2015 | Masterman |
| 2015/0143258 A1 | 5/2015 | Carolan et al. |
| 2015/0160328 A1 | 6/2015 | Peinhardt et al. |
| 2015/0184992 A1 | 7/2015 | Lee et al. |
| 2015/0248649 A1 | 9/2015 | Avats |
| 2015/0264047 A1 | 9/2015 | Roy et al. |
| 2015/0304436 A1* | 10/2015 | Vaccari ................. H04W 4/023 709/204 |
| 2015/0327015 A1* | 11/2015 | So ........................ G01S 5/0294 455/457 |
| 2015/0358766 A1 | 12/2015 | McDevitt et al. |
| 2015/0372994 A1 | 12/2015 | Stuntebeck |
| 2016/0005003 A1 | 1/2016 | Norris et al. |
| 2016/0012465 A1 | 1/2016 | Sharp |
| 2016/0026420 A1* | 1/2016 | Majid ................... G06F 3/1204 358/1.15 |
| 2016/0062984 A1 | 3/2016 | Caliendo et al. |
| 2016/0148133 A1 | 5/2016 | Haggar et al. |
| 2016/0182745 A1 | 6/2016 | Kandubai et al. |
| 2016/0301680 A1 | 10/2016 | Main et al. |
| 2017/0180276 A1 | 6/2017 | Gershony et al. |

* cited by examiner

LOCATION BASED NOTIFICATIONS

CROSS-REFERENCE TO RELATED APPLICATION

This application claims the benefit of U.S. Provisional Patent Application No. 62/114,152, filed on Feb. 10, 2015. The subject matter thereof is hereby incorporated herein by reference in its entirety.

FIELD

The present invention relates to location based notification, and more particularly, to notifying a user of agenda items or events based on his or her location.

BACKGROUND

Oracle Spatial™, often referred to as Spatial™, provides a SQL schema, and functions that facilitate the storage, retrieval, update, and query of collections of spatial features in an Oracle® database. Spatial™ include schema (MDSYS) that prescribes the storage, syntax, and semantics of supported geometric data types. Spatial™ also contains a spatial indexing mechanism and a set of operators and functions that perform area-of-interest queries, spatial join queries, and other spatial analysis operations. The spatial component of a spatial feature is the geometric representation of its shape in some coordinate space. This is referred to as its geometry.

Oracle Spatial™ is designed to make spatial data management easier and more natural to users of location-enabled applications and geographic information system (GIS) applications. Once spatial data is stored in an Oracle® database, the spatial data can be easily manipulated, retrieved, and related to all other data stored in the database.

Types of spatial data (other than GIS data) that can be stored using Spatial™ include data from computer-aided design (CAD) and computer-aided manufacturing (CAM) systems. Instead of operating on objects on a geographic scale, CAD/CAM systems work on a smaller scale, such as for an automobile engine or printed circuit boards.

The differences among these systems are in the size and precision of the data, not the data's complexity. The systems might all involve the same number of data points. On a geographic scale, the location of a bridge can vary by a few tenths of an inch without causing any noticeable problems to the road builders, whereas if the diameter of an engine's pistons is off by a few tenths of an inch, the engine will not run.

In addition, the complexity of data is independent of the absolute scale of the area being represented. For example, a printed circuit board is likely to have many thousands of objects etched on its surface, containing in its small area information that may be more complex than the details shown on a road builder's blueprints.

These applications all store, retrieve, update, or query some collection of features that have both nonspatial and spatial attributes. Examples of nonspatial attributes include name, soil type, landuse classification, and part number. The spatial attribute is a coordinate geometry, or vector-based representation of the shape of the feature.

Locale

Location aware applications are multiple, and perform specific functionality according to the user's current location. For example, an application entitled Locale allows the device to alter its behavior according to the current location. The application allows settings on the device to be automatically altered based on the current location of the device. For example, the device can automatically enable the Wi-Fi service when the device is near or enters a specific geographic location, or automatically silences the ringer as soon as the device enters the office location.

Microsoft Bing Maps™

Bing Maps™ is a web mapping service provided as a part of Microsoft's Bing suite of search engines, and powered by the Bing Maps™ for an enterprise framework. Using a user's location, applications that are developed can interact functionality based on the geographic location of the user. The user's current location can be accessed and interworked through the technology provided with Bing Maps™ to deliver content to the user that is pertinent to where the user is currently located.

SUMMARY

Certain embodiments of the present invention may provide solutions to the problems and needs in the art that have not yet been fully identified, appreciated, or solved by current location based notification systems. For example, in some embodiments, a notification system generally involves location-specific notification of data, and more specifically, to notifications displayed to a user based on the geographic location of the user. This also utilizes previously entered data such as a calendar application, or other types of data that is inputted by the user.

In one embodiment, a computer-implemented process includes generating a location based notification on a client device based on a location of the client device and data stored within the client device.

In another embodiment, an apparatus comprising at least one processor and memory comprising a set of instructions. The set of instructions with the at least one processor are configured to cause the apparatus to generate a location based notification on a client device based on a location of the client device and data stored within the client device.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
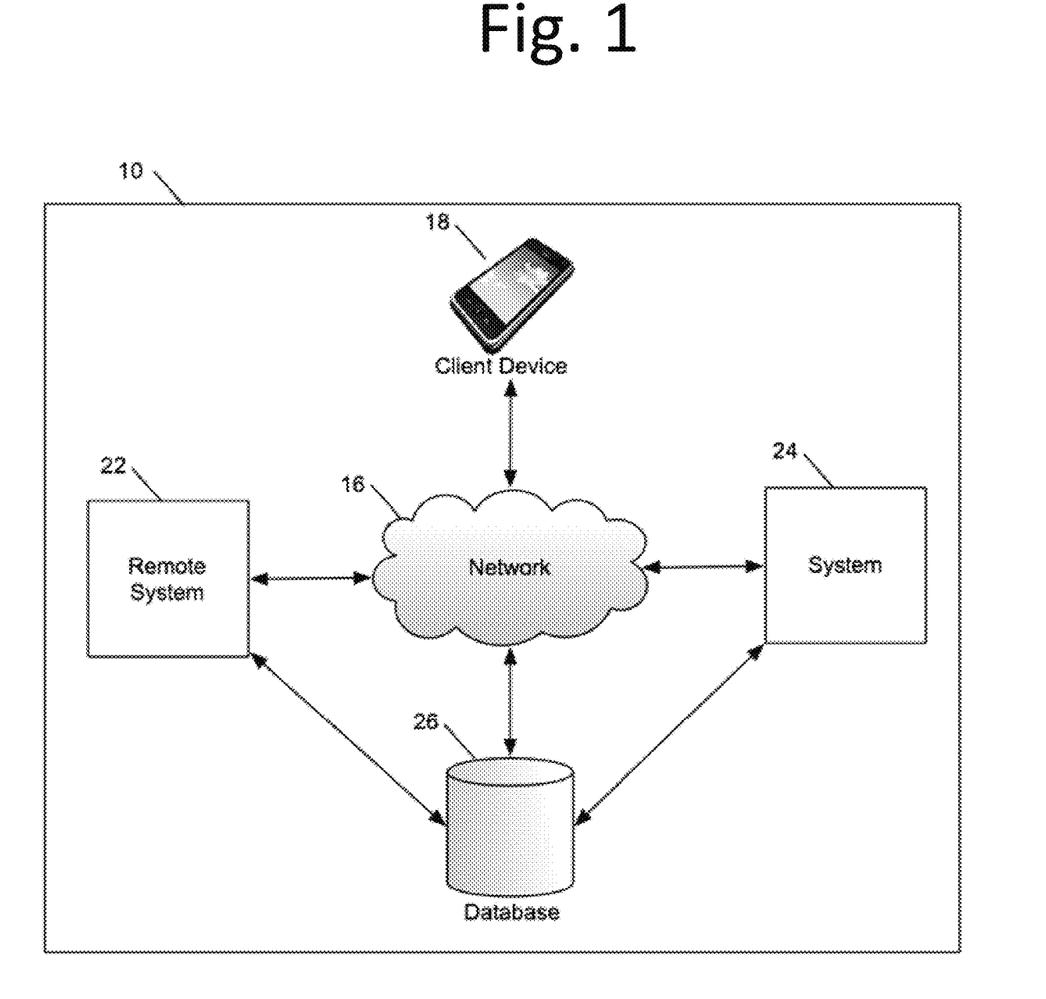
FIG. 1 is a block diagram illustrating system, according to an embodiment of the present invention.

FIG. 1 is a block diagram illustrating system 10, according to an embodiment of the present invention. System 10 allows a user utilizing a client machine (or device) 18 to access an application to be downloaded from the system 24, or that currently resides on the client's device 18. The term application in some embodiments may also be referred to as the current application or notification application, and may be in the form of software or software modules. While FIG. 1 shows a single client device 18, other embodiments may include more than one client device 18.

Client device 18 can be a mobile laptop device, a personal desktop computer, or a mobile device. In some embodiments, client device 18 may be a wearable device such as a watch, bracelet, headset, automobile interactive computer, or the like. Client device 18 in this embodiment is connected to the network 16. It should be noted that other types of devices, in addition to client device 18, might be used with the present application. For example, a PDA, a tablet computer, a laptop, an MP3 player, a gaming device, such as a hand held system or home based system, and a personal computer or other similar wired devices can also transmit and receive information, which could be used with the present application.

The user of the application may interface through client device 18, and connect through network 16 in order to access system 24. System 24 may be redundant, or be more than a single entity. Some of these embodiments may also include a remote system 22. Remote system 22 may be any remote server and/or database that is communicably coupled to network 16 and contains user data. This system may contain data obtained by Internet-related services by such organizations as Google®, Yahoo®, Microsoft®, etc.

In some embodiments, database 26 can be directly connected to the system 24, or may be remotely connected through network 16. In further embodiments, queued messages may be stored in database 26. Database 26 may also be separate entities, one for the remote system 22 and one for the system 24. The database 26 may also be either completely or a part of the remote system 26 and/or system 24.

The current application may reside on client device 18 in some embodiment. Client device 18 may be a mobile device. In other embodiments, the current application may also reside on a desktop computer, a personal digital assistant (PDA), tablet computer, or any other device that includes a processor, memory, and an operating system. If the current application resides on a mobile device, the current application may be downloaded through a platform, such as an application store or market. This platform may also reside on client device 18, and may connect to the application store or market to enable such downloading of the current application.

The current application may work with any device, such as a personal computer with a touch screen, a laptop with a touch screen, a personal computing tablet, a smartphone or any device with a processor, memory and a touch screen.

Tracking Objects an Locations

Objects and locations can be tracked in the current application allowing for specific interactions between the user and the current application. Objects and locations that are tracked can be any objects in the environment. These objects may be useful in reference to interactions between the users of the current application. For example, objects tracked may be physical and/or electrical devices, such as media hardware in conference rooms, printers located in the environment, fax machines, coffee machines, vending machines, etc. Locations tracked may be public or private areas. These areas may include conference rooms, break rooms, library areas, restrooms, reception areas, janitorial areas, cafeteria areas, areas of reference materials, departments such as human resources, senior managers, department managers, water fountains, etc.

The tracking of the objects and locations in the environment are established in the current application through the configuration area of the application in one embodiment. In another embodiment, the objects and locations are automatically established through interfacing with application programming interfaces (APIs) of software that are utilized to establish layouts of environments, such as office environments.

In the configuration area, the user has the ability to select areas of locations and objects in the environment and label the locations and object based on their identity and functionality. For example, a user may specify the location of the break room according to its geographic location. This is specified by entering in the coordinates of the room, e.g., latitude and longitude, in to the application, placing a device near the break room, and recording the signal strength from nearby wireless devices. In another embodiment, any process may be used to record the geographic point of locations and/or client device 18 within an environment. Once the locations and/or objects are geographically tracked, the results are stored in database 26, for example. Database 26 may also reside in client device 18, the system 24, remote system 22, in the cloud, such as network 16, or Internet.

Characteristics of the locations and objects in database 26 may also be inputted in addition to their geographic location. These characteristics may include any function of the location and/or object and the potential use to a user. For example, the break room may include the following characteristics: food, water, coffee, tea, hot chocolate, vending machine, relaxation, refrigerator, microwave, chairs and tables, extra chairs and tables, etc. In another example, a media computer in a conference room may include the following characteristics: conference room name, model, age, video support, connection support, software support.

Tracking a Device

In some embodiments, client devices 18 may be generally connected to the Internet and are tracked by applications if applicable permissions have been granted. The "Internet of Things" (IoT) allow for the proliferation of multiple different client devices 18 to be connected to the Internet, i.e., the geographic location of client 18 device can be known and tracked. In IoT, the precise location of the client device 18, as well as the geometric dimensions of client device 18 may be stored.

The tracking of client device 18 may occur via the following methods. For example, GPS may be used. With GPS, satellites are used to determine the location of client device 18 within a few meters. In another example, Wi-Fi may be used. With WIFI, the location of nearby Wi-Fi networks helps determine the geographic location of client device 18. Cell towers may determine the geographic location of client device 18 within a few thousand meters by monitoring the connection to the cellular network. Other information, such as an accelerometer, a compass, a gyroscope and/or a barometer, may be used to determine the location of client device 18.

In the Android® operating system, when the user has enabled "My Location", then the user's Cell, Wi-Fi, and/or GPS data will be sent to Google® to triangulate your location. This may occur when there is an application in the phone that requested for location. The user's GPS data may also be sent to Google® when the user uses, for example, Google Latitude™, Google Navigation™, a location-aware search, or use other location-based services.

This data allows applications to precisely locate client device 18 at such a granular level that client device 18 is able to be precisely located in an area, for example, an office environment. Utilizing this data, the current application is able to precisely locate the user of the application, as well as other users that are associated with the user, e.g., users that are invited recipients to upcoming meetings in the user's calendar.

Obtaining Calendar Data

The current application may reside in memory of client device 18, remote system or system 24. The calendar application may reside in memory of client device 18, remote system 22, or system 24. The current application is made aware of the user's agenda throe gh interworking with the user's calendar application on client device 18. Calendar applications offer APIs allowing $3^{rd}$ party developers to have granted access to the user's calendar data.

TABLE 1

| Calendar Agenda Calendar | |
|---|---|
| 7:00 am | |
| 8:00 am | Take medication |
| 9:00 am | |
| 10:00 am | |
| 11:00 am | |
| 12:00 pm | |
| 1:00 pm | Meeting with Tom |
| 2:00 pm | |
| 3:00 pm | |
| 4:00 pm | |
| 5:00 pm | |
| 6:00 pm | |
| 7:00 pm | |

TABLE 1-continued

Table 1 is an example of the user's agenda for a given day. The calendar application in some embodiment can be part of any calendar program allowing events and reminders to be entered and stored. This data may be stored on client device 18, cloud, or in a remote server/database through the Internet. As shown in Table 1, there are two entries, i.e., an 8:00 am reminder to take medication and a 1:00 pm meeting with Tom.

In some embodiment, a Calendar Provider is a repository for a user's calendar events in the Google® environment. The Calendar Provider API may allow a user to perform query, insert, update, and delete operations on calendars, events, attendees, reminders, etc.

Generally, to read or write calendar data, an application's manifest includes the proper permissions, described in User Permissions. To make performing common operations easier, the Calendar Provider offer a set of intents, as described in Calendar Intents. These intents take users to the Calendar application to insert, view, and edit events. The user interacts with the Calendar application and then returns to the original application. Thus, the user's application doesn't need to request permissions, nor does the application need to provide a user interface to view or create events.

Content providers store data and make the data accessible to applications. The content providers offered by, for example, the Android® platform (including the Calendar Provider) typically expose data as a set of tables based on a relational database model, where each row is a record and each column is data of a particular type and meaning. Through the Calendar Provider API, applications have read and write access to the database tables that hold a user's calendar data. A Calendar Contract object defines the data model of calendar and event related information. This data is stored in a number of tables, listed below:

| Table (Class) | Description |
|---|---|
| CalendarContract.Calendars | This table holds the calendar-specific information. Each row in this table contains the details for a single calendar, such as the name, color, sync information, and so on. |
| CalendarContract.Events | This table holds the event-specific information. Each row in this table has the information for a single event - for example, event title, location, start time, end time, and so on. The event can occur one-time or can recur multiple times. Attendees, reminders, and extended properties are stored in separate tables. They each have an EVENT_IDthat references the _ID in the Events table. |
| CalendarContract.Instances | This table holds the start and end time for each occurrence of an event. Each row in this table represents a single event occurrence. For one-time events there is a 1:1 mapping of instances to events. For recurring events, multiple rows are automatically generated that correspond to multiple occurrences of that event. |
| CalendarContract.Attendees | This table holds the event attendee (guest) information. Each row represents a single guest of an event. It specifies the type of guest and the guest's attendance response for the event. |
| CalendarContract.Reminders | This table holds the alert/notification data. Each row represents a single alert for an event. An event can have multiple reminders. The maximum number of reminders per event is specified inMAX_REMINDERS, which is |

| Table (Class) | Description |
|---|---|
| | set by the sync adapter that owns the given calendar. Reminders are specified in minutes before the event and have a method that determines how the user will be alerted. |

Using this and other similar functionality, 3$^{rd}$ party applications are able to retrieve a user's calendar event details.

By obtaining the details of the user's upcoming events, reminders, and tasks in the calendar, the application may interact this understanding with the current location, where notifications sent to the user allow for specific, intuitive interactions based on where the user is current located.

The following examples describe some embodiments of the application by depicting scenarios that include an office environment. In no way is the application limited to an office environment. For example, a person of ordinary skill in the art may migrate the embodiments of the application into other environments such as a home, a vehicle, a church, a school, etc.

Prioritized Agenda Items

As events are entered in a calendar application (by a user, a system, or any other individual and/or network element), additional functionality is incorporated into the application allowing for a prioritized agenda for the event. This prioritized agenda allows the user to specify a list of items that are to be discussed in the upcoming meeting and place a priority for each of the agenda items.

The priority entered into the calendar application is, in some embodiments, a notation that reflects a descending order of priority, e.g., a numerical representation for the priority of an event. In this embodiment, a priority number of "1" would indicate the highest priority item in the agenda, a priority number of "2" would indicate the next highest priority, etc. This prioritized agenda data may be obtained by the application through an API of the calendar application.

In reference to the above API, CalendarContract.Events may include a row for each event in the user' calendar. The application may store this data into a local construct (or an agenda array) containing each agenda item entered into the calendar application along with an associated priority element for the agenda item. By traversing the agenda array, the application may retrieve the prioritized agenda for the meeting.

Passing a Meeting Recipient

Figure 2:
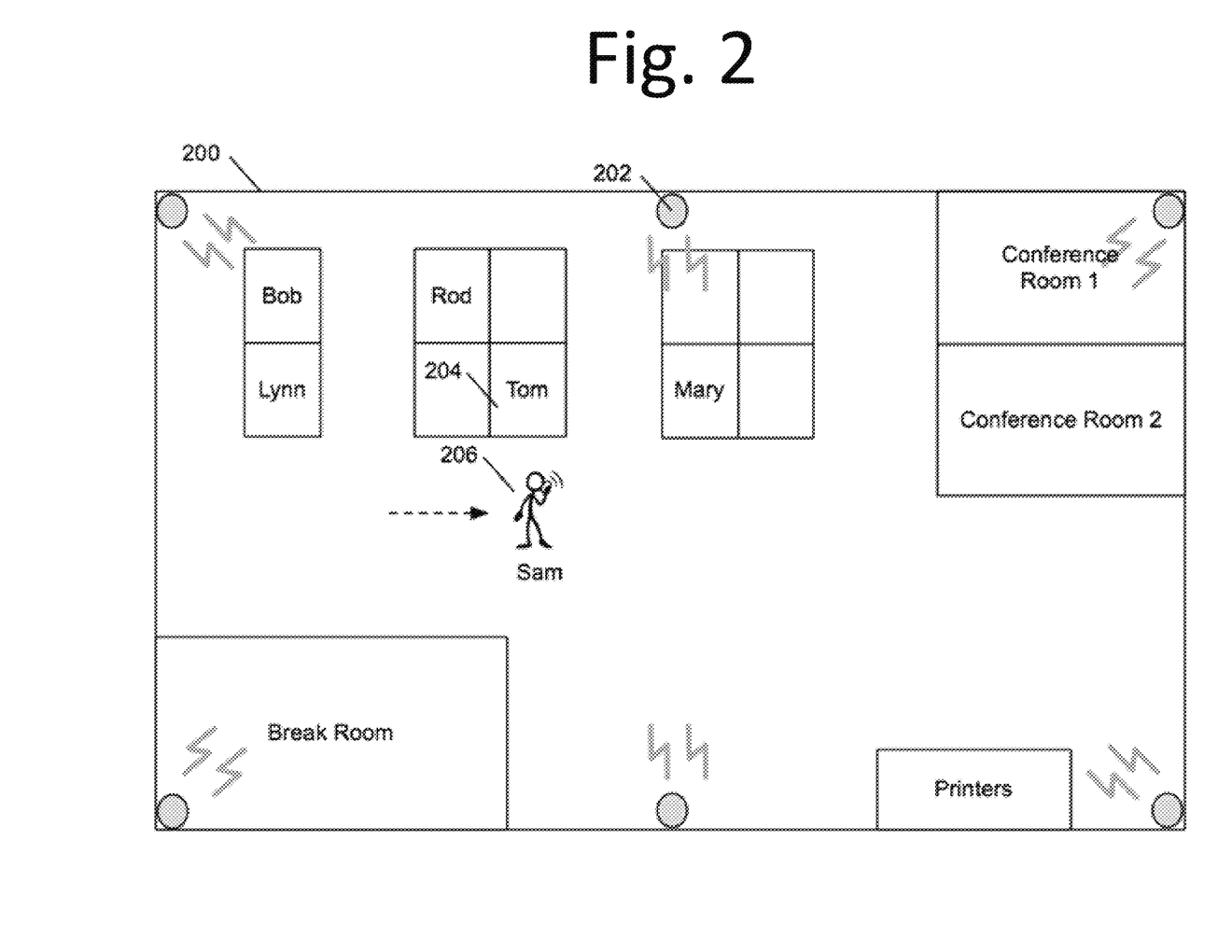
FIG. 2 is a diagram illustrating an office environment, according to an embodiment of the present invention.

FIG. 2 is a diagram illustrating an office environment 200, according to an embodiment of the present invention. In this embodiment, office environment 200 include six wireless access ports 202. Wireless access ports 202 may include Wi-Fi devices, cellular sites, Bluetooth mobile personal area network, etc.

User 206 "Sam" in this embodiment is walking through office environment 206. In this example, presuming the time is 7:50 am, the client device of user 206 may know the precise location of user 206. The application, executing on user's 206 client device, may determine that user 206 has a 1:00 pm meeting with Tom. The application may interface with a calendar application on the client device of user 206. The calendar application may include agenda information that is made available through an API further detailed herein.

The application, aware that the meeting is with the co-worker Tom, may determine that Tom is currently near user 206. This is known through location functionality further detailed herein. The application further determines that both user 206 and Tom are not utilizing their respective client devices, and if currently interacting with their client devices, user 206 and Tom are not in an active phone call on their respective client devices.

In another embodiment, the application may check network usage, such as the Internet activity, to further determine whether or not user 206 is surfing the Internet and may be available for an impromptu meeting. In other embodiments, the application may send a meeting request regardless of the current state of the client device of user 206 or any other recipient(s).

Application Notification—Contact

Figure 3:
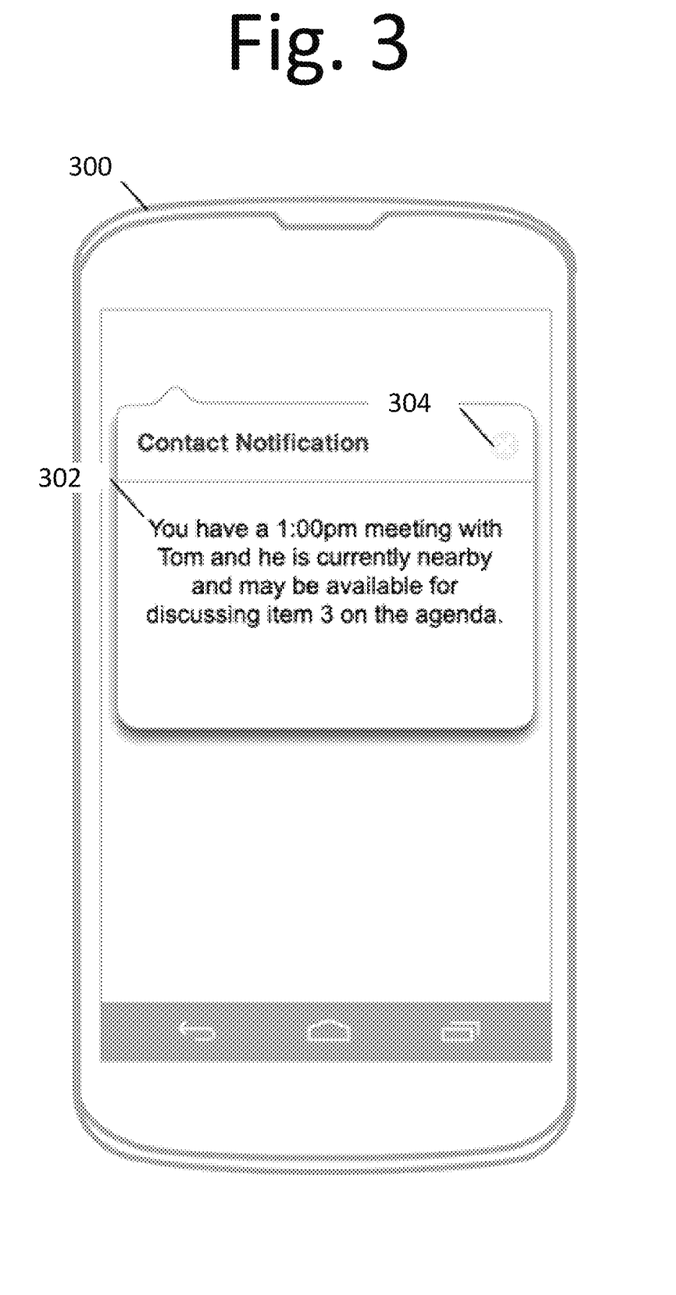
FIG. 3 is a client device illustrating a location-based meeting notification, according to an embodiment of the present invention.

FIG. 3 is a client device 300 illustrating a location-based meeting notification 302, according to an embodiment of the present invention. In this embodiment, client device 300 may display a location-based meeting notification 302 application. Notification 302 in some embodiments informs the user of the current location of the meeting attendee, Tom, and further informs the user that the meeting attendee is nearby to the current location of the user. Furthermore, notification 302 reminds the user that a meeting is currently scheduled with Tom, and provides the time of the meeting. Notification 302 may also suggest that in order to increase the user's productivity, it may be beneficial for the user to discuss one or more items on the agenda to enable a greater level of productivity.

In this embodiment, the user (e.g., Sam of FIG. 2) may have the option to dismiss notification 302. This can occur in a variety of ways. For example, the user may press an "X" button 304 on notification 302. The user may also dismiss notification 302 via a verbal command, a hand or body gesture, or after a certain amount of time has elapsed, etc. This may cause notification 302 to be removed, and replaced with the previous contents that was shown on the display of client device prior to the display of notification 302.

In further embodiments, notification 302 may include a particular agenda item such as a lowest or a highest priority item. In this example, the following agenda items have been obtained by the current application:

TABLE 2

Object Description of Calendar Event Data

| Priority | Agenda Item |
|---|---|
| 1 | Discuss the dates of the new 04 delivery schedule |
| 2 | Discuss the bitmap rendition of the pixelated graphics in the billing module |
| 3 | Discuss Tom's upcoming vacation |

As shown in Table 2, the lowest priority, i.e., "Discuss Tom's upcoming vacation", is an agenda item that can be easily discussed outside of the meeting. If the user and Tom can spend time discussing this item outside of the formal meeting, then the meeting may be more productive, and possibly shorter allowing for a more productive day. As such, notification 302 may include the text in the lowest priority agenda item, i.e., "Discuss Tom's upcoming vacation".

In another embodiment, if the user meets with Tom and discusses the agenda item or multiple agenda items in the impromptu meeting, then the user has the option of updating the agenda of the meeting by marking the completed agenda item(s) as completed. To perform this action, the calendar application is opened and the prioritized list of agenda items are listed in some embodiments. The agenda item(s) that are completed are removed by either interacting with a component on the GUI (e.g., a checkbox), or by utilizing a gesture (e.g., sliding the agenda item to the right or the left).

In another embodiment, if all of the agenda items are marked as completed, then the meeting is cancelled, and each attendee is automatically notified of the cancellation. In yet another embodiment, the middle or highest priority may be pushed into the notification message as is determined by the application. The application may also determine the length of each agenda item.

In one embodiment, the user may enter the amount of time for the agenda item into the calendar application by specifying the start and/or end time, or by entering the duration of the event. In another embodiment, the application may determine the normal duration of the event according to the historical data. For example, if the user normally has a weekly meeting at the same time on a particular day of the week, the application may query database 26 of FIG. 1, for example, by using the calendar API as further discussed herein. This allows the application to determine that the particular meeting is normally scheduled for an hour. Thus, the timeframe of each of the meetings in the future would most probably be the same amount of time.

Passing a Break Room

Figure 4:
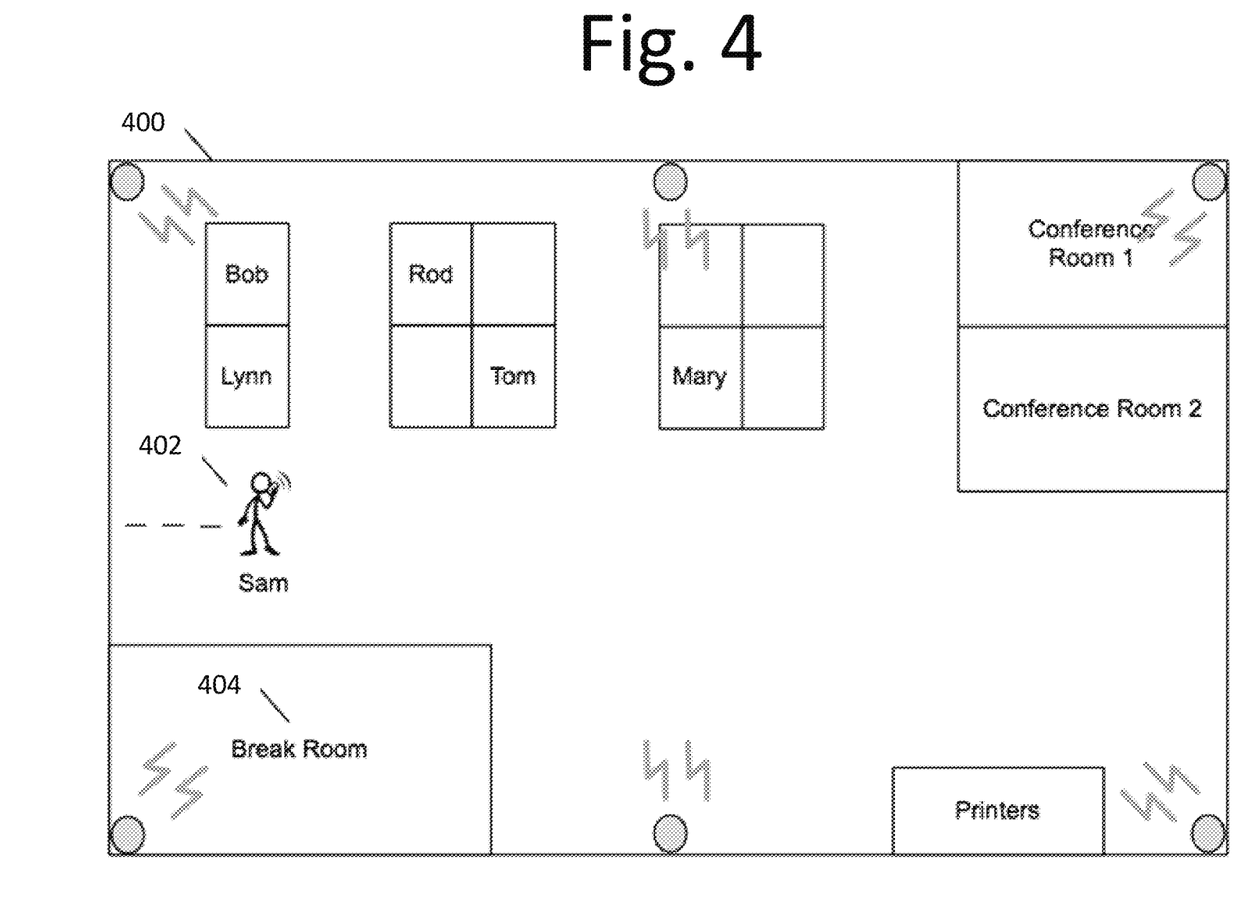
FIG. 4 is a diagram illustrating an office environment, according to an embodiment of the present invention.

FIG. 4 is a diagram illustrating an office environment 400, according to an embodiment of the present invention. In this embodiment, user 402 (i.e., Sam) is passing by a break room 404. The application, knowing the user's daily agenda, may determine that an agenda item is near: "Take Medicine" scheduled for 8:00 am. User 402 may wish to take the medicine near this location, as the break room would have access to food and water. This may be beneficial for user 402, since he would be taking his medication.

The application may also be aware that user 402 is near break room 404 since user's 402 client device may be connected to the network in the break room, for example, a Wi-Fi enabled refrigerator or any other devices that are in the break room and are connected to the Internet. In another embodiment, the map of the layout of the office is known by the application, and each room along with its coordinates on the floor of the office is entered in the application.

In this example, since the current time is 7:50 am, the application may send a notification to user 402 informing of the upcoming calendar event. In another embodiment, the application may notify user 402 at the time of the event when user 402 is near a source of water, e.g., a cafeteria, water fountain, break room, etc. If user 402 is not near a source of water, the application may provide the notification when user 402 nears a source of water.

Furthermore, if user 402 performs a specific action, for example, user 406 needs to take a medication within a specific period of time, the application may remind user 402 to do even when user 402 is not near a source of water prior to specific period of time ending.

Application Notification—Event

Figure 5:
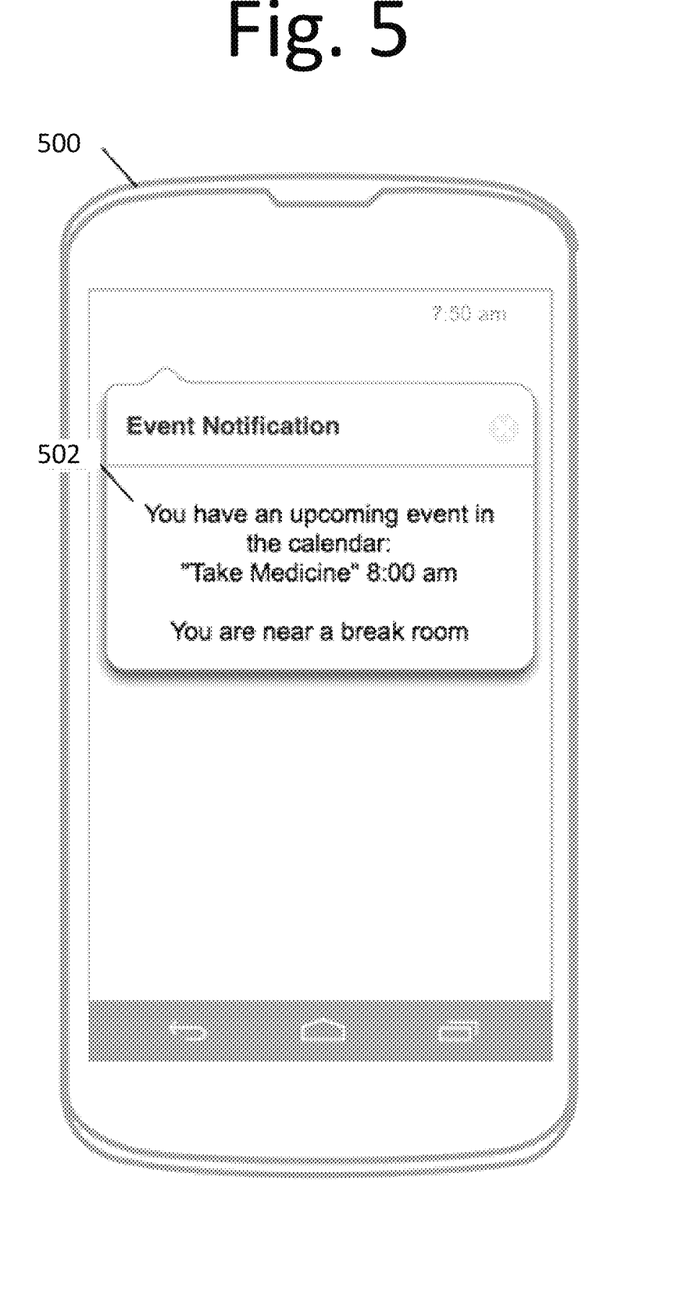
FIG. 5 is a client device illustrating a location-based meeting notification, according to an embodiment of the present invention.

FIG. 5 is a client device 500 illustrating a location-based meeting notification 502, according to an embodiment of the present invention. Notification 502 in this embodiment informs the user that client device 500 is currently near a break room and displays the event "Take Medicine" 8:00 am. This interaction allows the user to be made aware of agenda events according to where the user is currently located.

Near a Meeting Attendant and/or Printer

Figure 6:
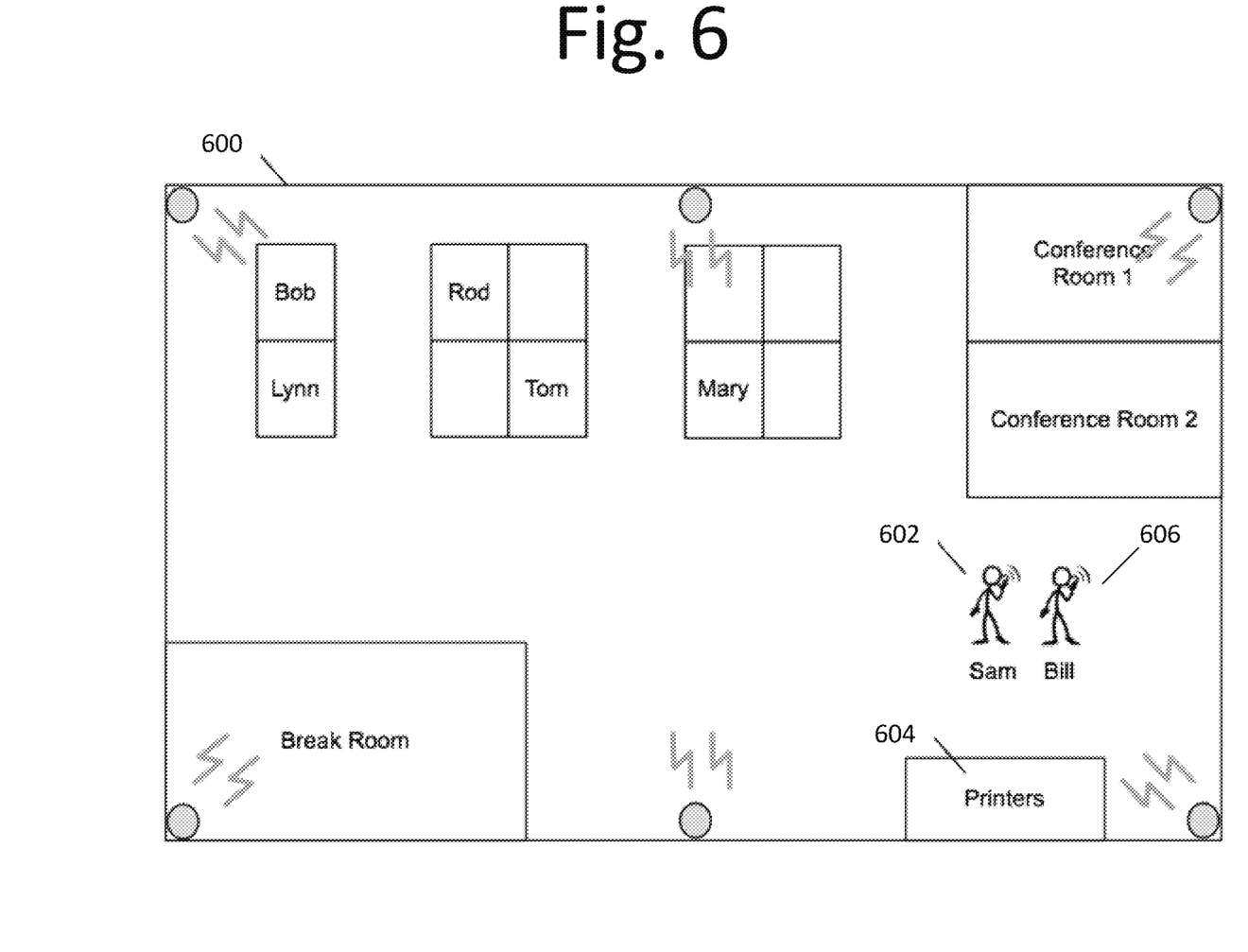
FIG. 6 is a diagram illustrating an office environment, according to an embodiment of the present invention.

FIG. 6 is a diagram illustrating an office environment 600, according to an embodiment of the present invention. In this embodiment, user 602 (Sam) and another user 606 (Bill) are in the same area, and in particular, next to a printing area 604. In this embodiment, it is assumed that the time is around 12 pm.

In this embodiment, the upcoming meeting between user 602 and user 606 may be in an hour, and that user 602 and user 606 are geographically located near printing area 604. This awareness allows the application to transmit a notification to user 602 and user 606. For example, the notification may include the following statement: do you wish to have an agenda and/or other related documents printed.

Application Notification—Event

Figure 7:
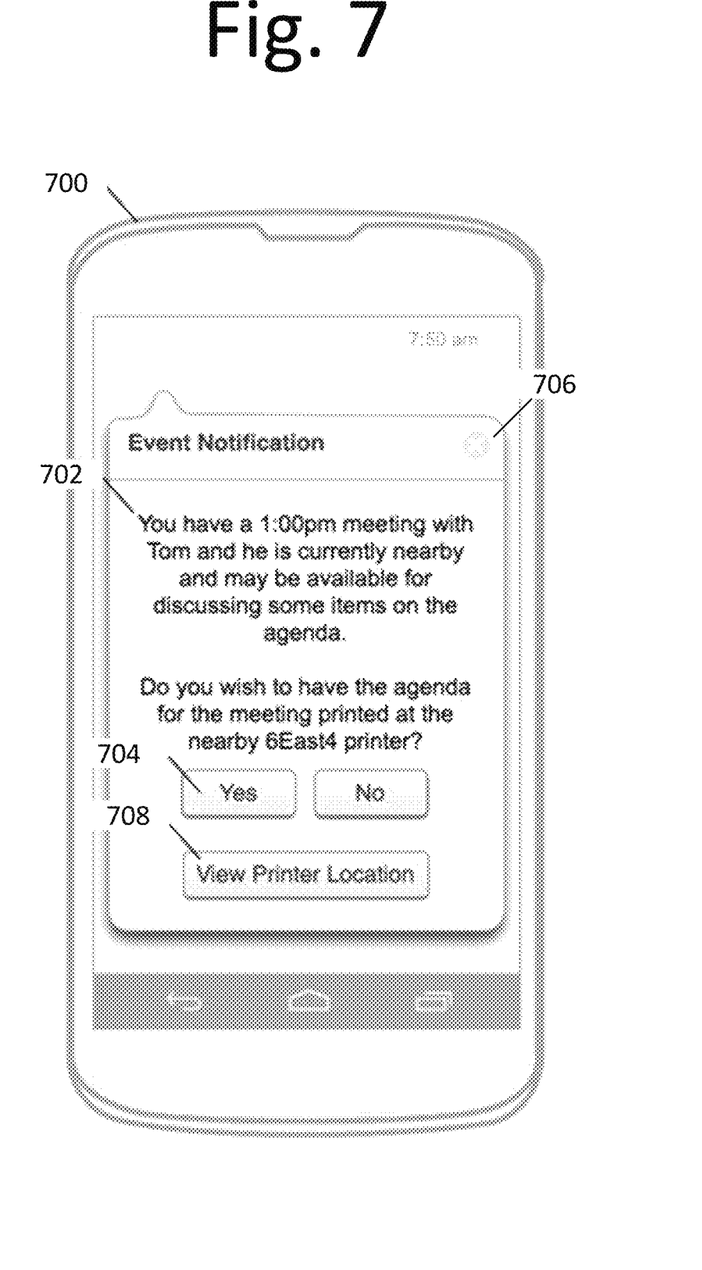
FIG. 7 is a client device illustrating a location-based notification, according to an embodiment of the present invention.

FIG. 7 is a client device 700 illustrating a location-based notification 702, according to an embodiment of the present invention. Notification 702 may inform the user of client device 700 that a person with whom a meeting has been scheduled is nearby and that there is a printer nearby. Notification 702 may also send or include the agenda that is to be printed out.

If the user selects "No" button 704, notification 702 is removed from the display of client device 700 and the previous data and/or components are redisplayed. The user may also select "X" button 704 on the top of the notification window to dismiss the entire notification.

If the user is interested in obtaining an agenda for the upcoming meeting, the user may select "Yes" button 708. The application, after receiving the positive answer to the question, may begin the process of sending the agenda document to the nearby printer. The agenda may be attached to the calendar data and may be present in the calendar item, in some embodiments. Through interfacing with the API of the calendar application, the application may gain access to the agenda file. This file may be automatically queued on a printer located near the users. In another embodiment, the application may monitor the activity of the printer and notifies the user or user when the queue has removed the agenda file.

The user may also select a button component entitled "View Printer Location" 708, allowing the application to use the geographic data points of the printer and to display a map with the printer signified by a graphical object such as a pin. In another embodiment, a specific priority agenda item may be included in notification 702, e.g., the lowest, middle or highest priority item on the agenda list. The text of the notification reflecting this embodiment may include the following: "You have a 1:00 pm meeting with Tom and he is currently nearby and may be available to discuss item 2 of the agenda: "Discuss the bitmap rendition of the pixelated graphics in the billing module".

In some embodiments, a component, such as a button component, entitled "Print Related Documents" may be included in notification 702. This button component may allow the user to request that documents related to item of the agenda list is printed at the nearest printer to where the user currently is located. In further embodiments, a component entitled "Agenda Items" may also be included in notification 702. This component may allow the user interact with the agenda items, and the user can add, delete and/or modify the items. In yet another embodiment, a component entitled "Secure Conference Room" may be included in notification 702. This component, when pressed, allows the application to interact with APIs of scheduling software to locate the nearest available conference room and then notifies the user of the scheduled room.

In yet another embodiment, if there is no printer in the area then the software automatically books the nearest "connected" conference room where the conference room has audio/video support or loads the agenda of the meeting automatically on the media to be displayed in said conference room. The software may also automatically load any associated documents related to the agenda items and/or the meeting contents on the media to be displayed in said conference room, or load documents that are related to the agenda item on the attendee's devices. These documents can be attached to the calendar item and stored in the calendar data. The software, through the querying of the calendar data obtains the files and provides either a link to the document, or sends the actual file to the devices of the attendees.

Figure 8:
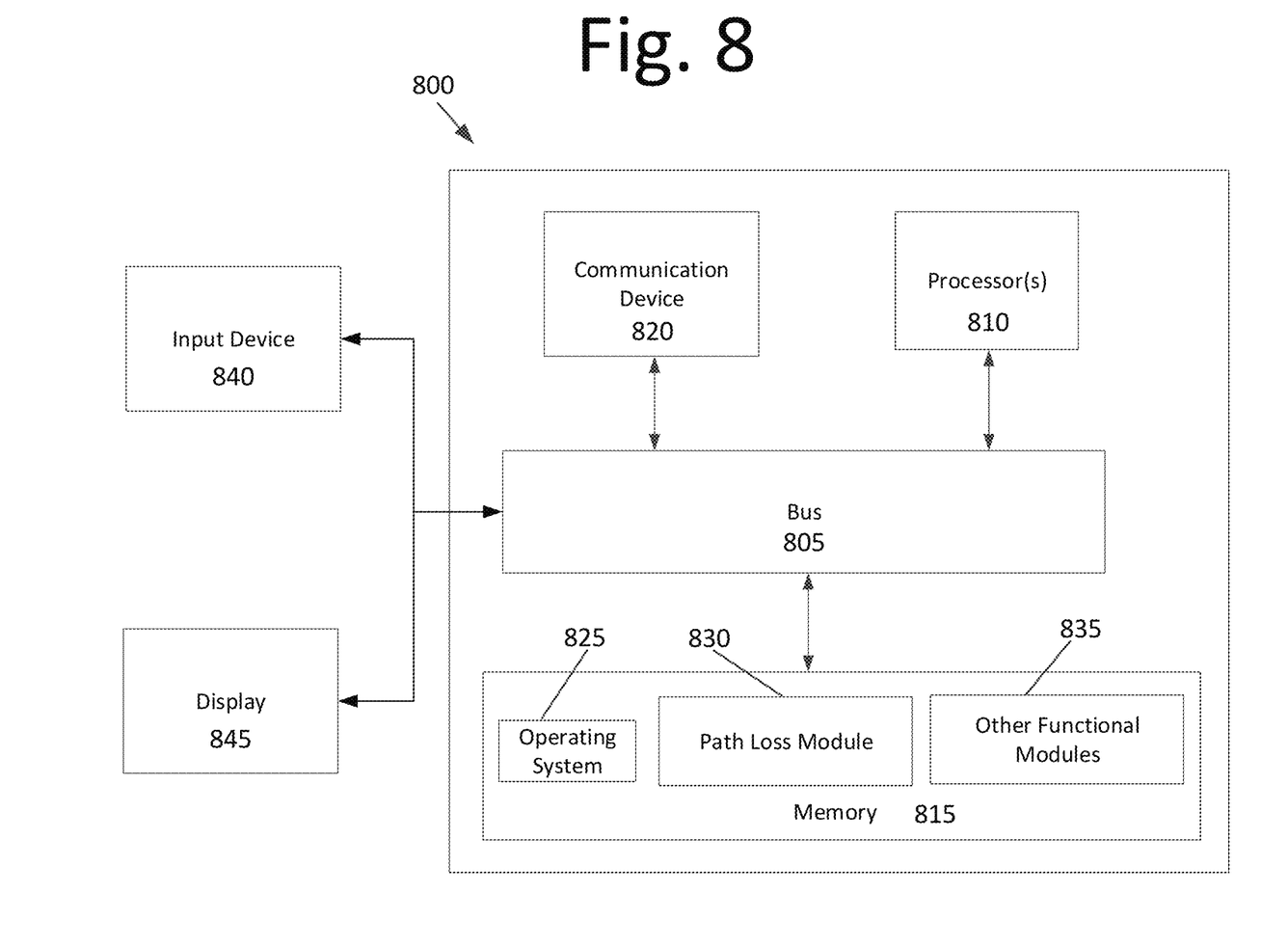
FIG. 8 is a block diagram illustrating a computing system, according to one embodiment of the present invention.

FIG. 8 is a block diagram illustrating a computing system 800, according to one embodiment of the present invention. Computing system 800 may include a bus 805 or other communication mechanism configured to communicate information, and at least one processor 810, coupled to bus 805, configured to process information. At least one processor 810 can be any type of general or specific purpose processor. Computing system 800 may also include memory 820 configured to store information and instructions to be executed by at least one processor 810. Memory 820 can be comprised of any combination of random access memory ("RAM"), read only memory ("ROM"), static storage such as a magnetic or optical disk, or any other type of computer readable medium. Computing system 800 may also include a communication device 815, such as a network interface card, configured to provide access to a network.

The computer readable medium may be any available media that can be accessed by at least one processor 810. The computer readable medium may include both volatile and nonvolatile medium, removable and non-removable media, and communication media. The communication media may include computer readable instructions, data structures, program modules, or other data and may include any information delivery media.

At least one processor 810 can also be coupled via bus 805 to a display 845, such as a Liquid Crystal Display ("LCD"). Display 845 may display information to the user, such as a location-based notification. An input device 840 may also be coupled to bus 805 to enable the user to interface with computing system 800.

According to one embodiment, memory 820 may store software modules that may provide functionality when executed by at least one processor 810. The modules can include an operating system 825 and a location based notification module (or application) 830, as well as other functional modules 835. Operating system 825 may provide operating system functionality for computing system 800. Because computing system 800 may be part of a larger system, computing system 800 may include one or more additional functional modules 835 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented process, comprising:
   tracking a location of a client device in relation to one or more other client devices via at least one of a Global Positioning System (GPS), a Wi-Fi positioning system (WPS), or a cellular network connection monitoring system;
   determining whether the client device is proximate to the one or more other client devices;
   determining whether a network usage of the client device meets one or more conditions;
   determining whether a network usage of the one or more other client devices meets the one or more conditions;
   generating a location based notification on the client device if the client device is proximate to the one or more other client devices, the network usage of the client device meets the one or more conditions, and the network usage of the one or more other client devices meets the one or more conditions; and
   wherein the location based notification is based on data stored within the client device.

2. The computer-implemented process of claim 1, wherein the data stored within the client device comprises a time, date, and location of one or more scheduled meetings, one or more scheduled tasks, one or more scheduled reminders, or a combination thereof.

3. The computer-implemented process of claim 1, further comprising:
   tracking the location of the client device in relation to the data stored within the client device.

4. The computer-implemented process of claim 1, further comprising:
   checking a calendar application on the client device to determine whether a meeting associated with the one or more other client devices exists, wherein the location based notification is generated on the client device only when the meeting associated with the one or more other client devices exists.

5. The computer-implemented process of claim 1, wherein the location based notification comprises a current location of the client device, a current location of one or more other client devices, or both.

6. The computer-implemented process of claim 1, wherein the location based notification further comprises one or more items on an agenda in a calendar.

7. The computer-implemented process of claim 1, wherein the location based notification further comprises a print option to print one or more items on an agenda in a calendar application to a printer.

8. The computer-implemented process of claim 1, wherein the network usage comprises an Internet activity level.

9. The computer-implemented process of claim 1, wherein the one or more conditions comprises an indication that the Internet is being accessed.

10. An apparatus, comprising:
    at least one processor; and
    memory comprising a set of instructions, wherein the set of instructions and the at least one processor are configured to:
       cause the apparatus to generate a location based notification on a client device based on a location of the client device and data stored within the client device;
       cause the apparatus to track the location of the client device in relation to one or more other client devices and determine whether the client device is proximate to the one or more other client devices via at least one of a Global Positioning System (GPS), a Wi-Fi positioning system (WPS), or a cellular network connection monitoring system; and
       cause the apparatus to determine whether network usage of the client device and the one or more other client devices meets one or more conditions, and if the one or more conditions are met, and if the client device is proximate to the one or more other client devices, cause the apparatus to generate the location based notification on the client device.

11. The apparatus of claim 10, wherein the set of instructions and the at least one processor are further configured to cause the apparatus to generate a location based notification on a client device based on a location of the client device, the data stored within the client device, a location of one or more other client devices, or a combination thereof.

12. The apparatus of claim 10, wherein the data stored within the client device comprises a time, date, and location of one or more scheduled meetings, one or more scheduled tasks, one or more scheduled reminders, or a combination thereof.

13. The apparatus of claim 10, wherein the set of instructions and the at least one processor are further configured to cause the apparatus to track the location of the client device in relation to the data stored within the client device.

14. The apparatus of claim 10, wherein the set of instructions and the at least one processor are further configured to cause the apparatus to check a calendar application on the client device to determine whether a meeting associated with the one or more other client devices exists, wherein the location based notification is generated on the client device only when the meeting associated with the one or more other client devices exists.

15. The apparatus of claim 10, wherein the location based notification comprises a current location of the client device, a current location of one or more other client devices, or both.

16. The apparatus of claim 10, wherein the location based notification further comprises one or more items on an agenda in a calendar.

17. The apparatus of claim 10, wherein the location based notification further comprises a print option to print one or more items on an agenda in a calendar application to a printer.

18. The apparatus of claim 10, wherein the network usage comprises an Internet activity level.

19. The apparatus of claim 10, wherein the one or more conditions comprises an indication that the Internet is being accessed.

* * * * *